3,535,292
EMULSION POLYMERIZATION WITH ALKALI METAL PEROXYDIPHOSPHATE

Harry M. Castrantas, Donald G. MacKellar, Paul R. Mucenieks, and Bernard Cohen, Trenton, N.J., assignors to FMC Corporation, New York, N.Y., a corporation of Delaware
No Drawing. Filed Jan. 30, 1969, Ser. No. 795,361
Int. Cl. C08f 1/60
U.S. Cl. 260—78.5     5 Claims

ABSTRACT OF THE DISCLOSURE

This invention relates to the emulsion polymerization of certain water-insoluble elastomers or vinyl compounds in an aqueous emulsion stabilized by an emulsifying agent in which water-soluble ammonium or alkali metal peroxydiphosphate salts are employed as polymerization initiators; these peroxydiphosphate salts are used alone or in conjunction with known polymerization initiators to commence polymerization and to drive the polymerization reaction to completion.

BACKGROUND OF THE INVENTION

Field of the invention

This invention relates to the art of emulsion polymerizations, and more specifically to emulsion polymerization in which an initiator is used to promote polymerization of a substantially water-insoluble monomer in an aqueous system.

Description of the prior art

It is known that certain substantially water-soluble, elastomer-forming monomers and water-insoluble, vinyl monomers can be polymerized while emulsified in an aqueous medium. This process, which is known as emulsion polymerization, commences by emulsifying a monomer in water, generally with an emulsifying agent, and converting the monomer to a high molecular weight polymer by addition polymerization, retaining the fundamental, physical state of a stable emulsion throughout the polymerization reaction. In order to maintain the emulsion in a stabilized state, and to facilitate reaction by forming micelles, emulsifying agents are normally added to the aqueous reaction medium. These emulsifying agents can be soaps or surfactants that depress the surface tension and typically are anionic surfactants or non-ionic surfactants. Also, protective colloids, that prevent agglomeration of the polymer, and buffers that adjust the pH of the emulsion are commonly employed. In carrying out the polymerization, the monomer, or monomers when a copolymer is to be formed, are added to water, along with a suitable emulsifying agent. To promote polymerization, an initiator or initiating system must then be added to the emulsion. The most popular initiators are the water-soluble variety, such as potassium, sodium or ammonium persulfate and hydrogen peroxide. On heating this mixture, the monomer commences to polymerize, and this reaction continues in a controlled manner under the influence of the initiator.

While the above initiators have been found effective, some difficulties have developed in this process. Initially, the initiator should have complete water solubility in order to make it effective throughout the emulsion at all of the polymerization loci. This requirement of water solubility materially limits the number of effective initiators which can be used. For example, hydrogen peroxide and peroxydisulfate salts, e.g., ammonium persulfate, while highly water-soluble, have the drawback of having relatively poor stability and therefore can decompose prematurely before the polymerization has gone to completion. This is detrimental to the reaction because the initiating effect may not be maintained throughout the polymerization; furthermore, the initiator is not present in material amounts during that stage of the reaction when its presence is most needed, namely at the end of the reaction when the concentration of the monomer particles is at its minimum. To remedy this, it is customary to add additional initiators to the reaction mixture as the reaction proceeds or alternatively to add an initiator, such as benzoyl peroxide, which is more stable than hydrogen peroxide or potassium persulfate under polymerization conditions. However, stable peroxides, such as benzoyl peroxide, have only limited solubility in water and therefore are not as effective initiators as the water-soluble persulfates or hydrogen peroxide.

Another difficulty with the present class of initiators is that the art is striving for better polymers, that is, higher molecular weights, better thermal stability and better yields than can be presently produced with the present known class of initiators. Thermal stability is an important asset of a polymer, since this minimizes color changes in the polymer when processed and shaped in various manufacturing stages requiring heating.

OBJECTS OF THE INVENTION

It is an object of the invention to describe an emulsion polymerization process in which an initiator is utilized which is completely water-soluble but which has high stability and is effective throughout the polymerization.

It is a further object of the present invention to describe an emulsion polymerization process in which the polymerization initiator produces polymers in higher yields, having improved heat and light stability and/or higher molecular weights than previously obtained.

It is still a further object to improve the long term storage stability of certain latexes by carrying out an emulsion polymerization with a selected class of polymerization initiators.

These and other objects will be apparent from the following disclosure.

SUMMARY OF THE INVENTION

We have now found an improved method for the emulsion polymerization of certain monomers and copolymers in an aqueous medium containing an emulsifying agent, by carrying out said polymerization in the presence of ammonium or alkali metal peroxydiphosphate salts as initiators; the monomers and copolymers subject to improved polymerization are vinyl acetate, vinyl acetate-dibutylmaleate, vinyl acetate-dibutylfumarate, vinyl chloride, vinylidene chloride, styrene and copolymers of styrene (particularly styrene-butadiene), lower alkyl ester acrylates and methacrylates and the polymerizable elastomeric monomers, 2-chloro-butadiene 1,3 (neoprene) and styrene-butadiene containing at least 50% butadiene.

DESCRIPTION OF THE INVENTION AND THE PREFERRED EMBODIMENTS

The present invention can be carried out using conventional thermal polymerization systems; if polymerization is desired at lower temperatures, the invention can be practiced using conventional reduction-oxidation (redox) systems. In a thermally activated polymerization system, a substantially water-insoluble monomer, e.g., vinyl acetate, is added to water along with a suitable emulsifying agent to form a stable emulsion. If the anticipated polymerization reaction is a vigorous one involving large amounts of exotherm, only a small portion of the monomer, i.e., about 10% of the total, is added initially to the aqueous reaction media. With certain monomers, such as vinyl acetate, a water-soluble hydrophilic compound, e.g., polyvinyl alcohol, is also added in amounts of 1 to 5% to prevent agglomeration of the polymer particles as they are formed. These colloids are not absorbed within the polymer particles but remain on the surface and prevent agglomeration by enveloping the polymer.

To this emulsion is then added an initiating amount of a water-soluble, alkali metal peroxydiphosphate, and the resulting mixture is heated and maintained at a preselected temperature. Normally, the mixture is heated to temperatures of 40° to 90° C. to effect polymerization within a reasonable time but without degrading the polymer due to excessive heat. Thereafter, incremental amounts of the monomer are added to the reaction mixture. This may be done by adding either aliquot portions or a continuous stream of the monomer to the reaction mixture to continue the polymerization reaction.

The charging of the monomer into the reaction mixture over a period of time as the reaction proceeds achieves two beneficial results. Initially, it avoids the build up of excess heat of polymerization leading to runaway reactions. Further, it helps to control the size of the polymerized particles in aqueous emulsion by avoiding clumping of the vinyl polymer.

The above basic thermal polymerization technique can also be varied with certain polymers, for example, certain acrylates, such as methyl methacrylate. In this system the entire charge of methyl methacrylate is mixed with enough water and an emulsifying agent to form a stable emulsion; an initiating amount of alkali metal peroxydiphosphate is then added to this preformed emulsion. A portion of this emulsion is added to water in a reaction vessel, this water serving as the reaction medium, and heated until polymerization commences. Thereafter, the preformed emulsion containing the peroxydiphosphate initiator is slowly added in increments or continuously, but at a very slow rate, to the reaction vessel while polymerization proceeds. This technique is utilized where the monomer must be added in emulsified form to avoid clumping and other undesired physical changes in the emulsion which render the resulting polymerized latex difficult to work with.

If the monomer which is to be polymerized is a gas, e.g., vinyl chloride, a slightly different technique is used. In this system a pressure bottle is charged with water and an emulsifying agent, and the mixture is frozen at temperatures of $-15°$ C. Thereafter, an aqueous solution of peroxydiphosphate catalyst is added to the bottle, and the contents are again frozen. Thereafter, vinyl chloride is added to the bottle in one complete charge as a liquid, and the entire bottle is capped and heated to carry out the total polymerization. In this latter case polymerization normally takes place in a water bath to dissipate the heat of polymerization.

In the above thermal system, the polymerization is carried out by heating the emulsion of monomer and water in the presence of the initiator. However, where polymerization must be carried out at lower temperatures than is customary with thermal systems, a conventional redox system can be employed in the practice of the present invention. In this system the desired monomer is added to water along with an emulsifying agent and the peroxydiphosphate initiator. In addition, a known reducing agent, such as sodium metabisulfite ($Na_2S_2O_5$), is added along with a metal salt, such as ferrous sulfate. This mixture is only moderately heated to temperatures usually not above 50° C. Normally, at these lower temperatures the reaction would be too slow for commercial use in the absence of the metal salt and the reducing agent. However, in the presence of these additives, the peroxydiphosphate ion itself is activated by reaction with the metal salt and initiates polymerization of the monomer at these lower temperatures. The oxidized metal salt (e.g., ferric sulfate) then in turn is reacted with the metabisulfite to restore the salt to its original valence so that it is once again regenerated and can activate additional amounts of the peroxydiphosphate initiator. In this redox system, the metal salt is periodically reduced and oxidized in a continuous cycle during which is activates the peroxydiphosphate initiator so that polymerization proceeds at low temperatures.

The peroxydiphosphate salts which are useful in the present invention are those which contain sodium, potassium, lithium or ammonium as cations. These include the tetrasodium peroxydiphosphate, tetrapotassium peroxydiphosphate, tetralithium peroxydiphosphate, tetrammonium peroxydiphosphate and the protonated salts thereof, such as $(NH_4)_2H_2P_2O_8$. In addition, peroxydiphosphate compounds containing mixtures of these cations can also be utilized. These include the peroxydiphosphate salts identified by the formula: $M_mN_{4-(m+n)}H_nP_2O_8$, where M and N are cations which may be either sodium, potassium, lithium or ammonium cations but where M is a different cation from N, where $m$ is an integer from 1 to 3 and $n$ is an integer of 0 or 2, and $(m+n)$ are less than 4. These compounds can be prepared as reported in co-pending application Ser. No. 688,525, filed Dec. 6, 1967, in the name of Paul R. Mucenieks. The specific peroxydiphosphate mixed salts are disclosed in U.S. patent application Ser. No. 755,811, filed on Aug. 28, 1968 in the name of Bernard Cohen. Typical examples of these mixed peroxydiphosphate salts are set forth below:

tripotassium monosodium peroxydiphosphate ($K_3NaP_2O_8$)
dipotassium disodium peroxydiphosphate ($K_2Na_2P_2O_8 \cdot 2H_2O$)
monopotassium trisodium peroxydiphosphate ($KNa_3P_2O_8$)
monoammonium tripotassium peroxydiphosphate ($K_3(NH_4)P_2O_8$)
diammonium dipotassium peroxydiphosphate ($K_2(NH_4)_2P_2O_8 \cdot 2H_2O$)
triammonium monopotassium peroxydiphosphate ($K(NH_4)_3P_2O_8 \cdot 2H_2O$)
monoammonium trisodium peroxydiphosphate ($NH_4Na_3P_2O_8$)
diammonium disodium peroxydiphosphate ($(NH_4)_2Na_2P_2O_8$)
triammonium monosodium peroxydiphosphate ($(NH_4)_3NaP_2O_8$)
monopotassium monosodium dihydrogen peroxydiphosphate ($KNaH_2P_2O_8$)
monoammonium monopotassium dihydrogen peroxydiphosphate ($K(NH_4)H_2P_2O_8$)
monoammonium monosodium dihydrogen peroxydiphosphate ($Na(NH_4)H_2P_2O_8$)
trilithium monopotassium peroxydiphosphate ($Li_3KP_2O_8$)
dilithium dipotassium peroxydiphosphate ($Li_2K_2P_2O_8$)
monolithium tripotassium peroxydiphosphate ($LiK_3P_2O_8$)
trilithium monosodium peroxydiphosphate ($Li_3NaP_2O_8$)
dilithium disodium peroxydiphosphate ($Li_2Na_2P_2O_8$)
monolithium trisodium peroxydiphosphate ($LiNa_3P_2O_8$)
triammonium monolithium peroxydiphosphate ($(NH_4)_3LiP_2O_8$)
diammonium dilithium peroxydiphosphate ($(NH_4)_2Li_2P_2O_8$)
monoammonium trilithium peroxydiphosphate ($(NH_4)Li_3P_2O_8$)
monolithium monosodium dihydrogen peroxydiphosphate ($LiNaH_2P_2O_8$)
monoammonium monolithium dihydrogen peroxydiphosphate ($(NH_4)LiH_2P_2O_8$)
monolithium monopotassium dihydrogen peroxydiphosphate ($LiKH_2P_2O_8$)

In the above-described modes of carrying out the invention, the peroxydiphosphate initiators have been used alone to effect polymerization of the water-insoluble monomer. However, the present peroxydiphosphate compounds are more stable than previous, water-soluble initiators and therefore have a greater half-life than prior polymerization initiators, such as hydrogen peroxide or peroxydisulfate salts. Accordingly, the present peroxydiphosphate compounds can also be used in conjunction with other known polymerization initiators in order to continue the initiation of a polymerization reaction even at high temperatures. For example, if polymerization of vinyl acetate were desired, both potassium peroxydisulfate and tetrapotassium peroxydiphosphate can be used together to effect polymerization. The peroxydisulfate is effective during the initial polymerization period, particularly at lower temperatures, i.e., below about 70° C. As polymerization continues at higher temperatures, and the peroxydisulfate becomes exhausted, the peroxydiphosphate catalyst then serves as the initiator during the latter portions of the reaction to continue initiating the polymerization reaction through the final polymerization period.

As a result of the higher stability of the peroxydiphosphate initiator, slower release of free radicals from the peroxydiphosphates is obtained compared with peroxydisulfates. This means that the polymerization can be carried out at higher temperatures with less chance of "running out" of the initiator. Further, since the peroxydiphosphate is completely water-soluble, free radicals are released homogeneously throughout the monomer emulsion in order to obtain effective polymerization at the surface of all the monomer particles.

Also, where polymers of very high molecular weight (high intrinsic viscosities) are desired, e.g., molecular weights of over 500,000, it is necessary to reduce the concentration of the initiator considerably. This reduction in the total amount of initiator employed plus the relatively short half-life of prior water-soluble initiators often results in "running out" of initiator prior to completing the polymerization. This will result in materially lowering the yield of polymer obtained by monomer conversion. By contrast, when using the peroxydiphosphate initiators of the present invention, the molecular weights of the polymer, as measured by intrinsic viscosity, increase without sacrificing yields. The intrinsic viscosity represents the capacity of a polymer to increase viscosity and increases as the molecular weight of the polymer increases.

In carrying out the present emulsion polymerization, an emulsifying agent is utilized in the preparation of the aqueous monomer emulsion. The emulsifying agent can be any conventional compound having emulsifying properties and which does not interfere with the polymerization reaction. The emulsifying agent can be a soap, a fatty acid ester, e.g., ammonium stearate, or a non-ionic or anionic surface active agent (surfactant). The anionic surface active agent useful in the present invention can be non-soap synthetic detergents made up of phosphate esters which are the alkylphenoxypoly(ethyleneoxy)ethyl esters of phosphoric acid, e.g., GAFAC PE–510, GAFAC RE–610, GAFAC RE–960, and of water-soluble salts of organic sulfuric reaction products having from about 8 to about 18 carbon atoms in the form of an alkyl or acyl radical within the molecular structure and containing sulfuric or sulfonic acid ester radicals. Typical examples of these anionic surface active agents are sodium or potassium alkyl benzene sulfonates in which the alkyl group contains from about 8 to about 18 carbon atoms, e.g., sodium dodecylbenzene sulfonate, sodium tridecylbenzene sulfonate; the sodium and potassium alkyl glycerol ether sulfonates, including ethers of higher fatty alcohols derived from the reduction of coconut oils; the reaction products of higher fatty acids, e.g., coconut oil with sodium or potassium isothionate; sodium or potassium alkyl sulfonates and sulfates obtained by sulfonation of coconut or tallow fatty alcohols and mixtures of such alkyl sulfates; dialkyl esters of sodium or potassium salts of sulfosuccinic acid; sodium and potassium salts of sulfated or sulfonated monoglycerides, e.g., those derived from coconut oil; sodium or potassium salts of higher fatty alcohol esters of sulfocarboxylic acids, e.g., sodium salt of lauryl alcohol ester of sulfoacetic acid; and other anionic agents set forth in U.S. Pat. 2,486,921, issued to Byerly on Nov. 1, 1949.

The nonionic surface active agents useful in the present invention are nonsoap synthetic detergents made up of a water solubilizing polyoxyethylene group in chemical combination with an organic hydrophobic compound. Among the hydrophobic compounds which can be used are polyoxypropylene, the reaction product of propylene oxide and ethylene diamine, aliphatic alcohols, etc. Examples of nonionic synthetic detergents useful in the present invention are condensation products of 3–50 moles of ethylene oxide, and preferably 10–40 moles, with 1 mole of an alkyl phenol containing 6–12 carbon atoms, in the alkyl group; condensation products of 3–50 moles of ethylene oxide with 1 mole of an aliphatic straight or branched-chained alcohol containing 8–18 carbon atoms; condensation products of ethylene oxide and the reaction product of propylene oxide and ethylene diamine; nonylphenol polyethoxy ethanol (commercially known as "Triton N" series); isooctyl phenol polyethoxy ethanol (commercially known as "Triton X" series). Another well-known group of nonionic detergents is known under the trade name of the "pluronic" series. These compounds are the reaction products obtained by condensing ethylene oxide with a hydrophobic base produced by the condensation of propylene oxide with propylene glycol. The molecular weight of these nonionic synthetic detergents will range from as low as 800 up to 12,000.

The emulsifying agent is normally added in amounts of 0.1 to 10% by weight of emulsion.

The following examples are given to illustrate the invention and are not deemed to be limiting thereof.

Example 1.—Vinyl polymerization

A three-neck, two-liter, glass flask equipped with a mechanical stirrer, thermometer, reflux condenser and dropping funnel was placed into a water bath maintained at 70° C. ±0.2° C. The flask was charged with 30.6 grams of polyvinyl alcohol, 1.7 grams of octyl phenoxy polyethoxy ethanol containing 40 ethoxy units (Triton X–405), 1 gram of sodium bicarbonate and 494 grams of deionized water. After stirring for 15 minutes, 69 grams of freshly distilled vinyl acetate were added to the flask. After an additional 15 minutes, a solution of 3 grams of tetrapotassium peroxydiphosphate ($K_4P_2O_8$) in 10 grams of water were added to the mixture through the condenser. An additional 45 grams of water were added to the mixture through the reflux condenser in order to wash down the condenser walls. Upon observing a temperature rise of 2° C. above the initial reflux temperature, 621 grams of vinyl acetate were added dropwise to the emulsion over a 120 minute period. The reaction was then continued for an additional 140 minutes and terminated. The resulting polymer was then evaluated to determine its intrinsic viscosity and thermal stability. The intrinsic viscosity is a limit of the reduced and inherent viscosity as the concentration of the polymeric solute approaches 0; it represents the capacity of the polymer to increase viscosity. The intrinsic viscosity was determined by the method set forth in ASTM–D123–66 except that monochlorobenzene was used as the solvent in place of cyclohexanone. The results are set forth in Table I.

Example 2.—Vinyl acetate polymerization

The same procedure was repeated as set forth in Example 1, using the same equipment, except as follows. The water bath temperature was increased to 90° C., and 38 minutes after adding the tetrapotassium peroxydiphosphate, the vinyl acetate monomer was added dropwise over a 180 minute period. After an additional 172 minutes following the addition of the monomer, the reaction was terminated. The resulting polymer was tested as in Example 1, and the results of the tests are set forth in Table I.

Example A.—Prior art

The same procedure as set forth in Example 1 was used except that 2.2 grams of potassium peroxydisulfate ($K_2S_2O_8$) were substituted for the tetrapotassium peroxydiphosphate utilized in Example 1. In this example the vinyl acetate was initially added dropwise five minutes after adding the initiator, and the addition was continued over a 120 minute period. After an additional 205 minutes, the reaction was terminated. The resulting polymer was tested as in Example 1, and the results of the tests are set forth in Table I.

Example B.—Prior art

The same procedure and equipment was utilized as set forth in Example A, except that the time required to add the monomer was increased to 204 minutes. After a total of 243 minutes, the bath temperature was increased to 90° C. for the remaining 116 minutes of the reaction. The resulting polymer was tested as in Example 1, and the results of the tests are set forth in Table I.

Example 3.—Vinyl acetate polymerization

Using the same equipment and procedure as set forth in Example 1, 1.7 grams of tetrapotassium peroxydiphosphate were added along with 2.2 grams of $K_2S_2O_8$. The vinyl acetate monomer was added dropwise over a period of 204 minutes. After a total of 243 minutes, the bath temperature was increased to 90° C. for the remaining 116 minutes of the reaction. The resulting polymer was tested as in Example 1, and the results of the tests are set forth in Table I.

Example C.—Prior art

Using the same equipment and procedure set forth in Example 3, 1.1 grams of benzoyl peroxide were added along with 2.2 grams of $K_2S_2O_8$. The resulting polymer was tested as in Example 1, and the results of the tests are set forth in Table I.

Example 4.—Vinyl acetate polymerization

Using the same equipment and procedure as in Example 1, 2.3 grams of $K_2H_2P_2O_8$ were substituted for the $K_4P_2O_8$ of Example 1. Forty minutes after the addition of the $K_2H_2P_2O_8$ initiator, the vinyl acetate was added dropwise over a 180 minute period at 80° C. After an additional 80 minutes, the reaction was terminated. The resulting polymer was tested as in Example 1, and the results of the tests are set forth in Table I.

Example 5.—Vinyl acetate polymerization

Using the same equipment and procedure as set forth in Example 1, 2.5 grams of tetraammonium peroxydiphosphate were substituted for the tetrapotassium peroxydiphosphate initiator. Thirty minutes after the addition of the initiator, the vinyl acetate was added dropwise over a 194 minute period. After an additional 41 minutes, the reaction temperature was increased to 83° C. for the remaining 54 minutes of the reaction. The resulting polymer was tested as in Example 1, and the results of the tests are set forth in Table I.

Example 6.—Vinyl acetate polymerization

Using the same equipment, reactants and procedure set forth in Example 1, the water bath temperature was decreased to 50° C., and nitrogen was bubbled through the charged flask to displace the air. Thereafter, 2.8 grams of $Na_2S_2O_5$ and 0.15 gram of $FeSO_4$ were added to the $K_4P_2O_8$ mixture to form a redox system. Forty-eight minutes after the $K_4P_2O_8$ initiator-redox addition, the vinyl acetate was added to the mixture over 72 minutes. The reaction was permitted to continue for an additional 218 minutes and thereafter terminated. The resulting polymer was tested as in Example 1, and the results of the tests are set forth in Table I.

TABLE I.—VINYL ACETATE POLYMERIZATIONS

| | \multicolumn{9}{c}{Example Number} |
|---|---|---|---|---|---|---|---|---|---|
| | 1 | 2 | A-prior art | B-prior art | 3 | C-prior art | 4 | 5 | 6 |
| Initiator system | (1) | (1) | (2) | (2) | (3) | (4) | (5) | (6) | (7) |
| Reaction temp., °C | 70 | 90 | 70 | 70-90 | 70-90 | 70-90 | 80 | 70-83 | 50 |
| Inception time, mins | 60 | 38 | 5 | 5 | 5 | 5 | 40 | 30 | 48 |
| Monomer addition time, mins | 120 | 180 | 120 | 204 | 204 | 204 | 180 | 194 | 74 |
| Total reaction time, mins | 320 | 390 | 330 | 364 | 364 | 364 | 300 | 319 | 340 |
| Latex viscosity, cps | | | | | 520 | 1,200 | 1,200 | | |
| Percent unreacted vinyl acetate, $Br_2$ titration | | | | | 0.74 | 0.46 | 0.54 | | |
| Percent conversion-monomer to polymer | 98+ | 97.8 | 99 | 96.7 | 98.5 | 97.0 | 98.6 | 95.5 | 96.2 |
| Intrinsic viscosity, $\eta$ | 1.36 | 0.77 | 0.57 | 0.56 | 0.52 | 0.43 | 1.62 | | 2.4 |
| Thermal stability color 3.5 at 150° C | (8) | (8) | (9) | (10) | (11) | (9) | (12) | (13) | (8) |
| Polymer weight loss 450 hours at 150° C | 3.6 | 5 | 9.3 | 21 | 4 | 12.5 | 4.5 | 3.7 | 3 |

1 $K_4P_2O_8$.
2 $K_2S_2O_8$.
3 $K_2S_2O_8+K_4P_2O_8$.
4 $K_2SO_8+Bz_2O_2$.
5 $K_2H_2P_2O_8$.
6 $(NH_4)_4P_2O_8$.
7 $K_4P_2O_8+Na_2S_2O_5+FeSO_4$.
8 Light yellow.
9 Light amber.
10 Medium amber.
11 Light yellow-amber.
12 Very light yellow.
13 Very light amber.

Example 7.—Methyl methacrylate polymerization

An emulsion was prepared consisting of 300 grams of freshly distilled methyl methacrylate, 300 grams of deionized water, 12 grams of a surfactant, Triton X-200 (an alkylaryl polyether sulfonate) and 0.96 gram of $K_4P_2O_8$. Using the same equipment as described in Example 1 except for the use of a 1-liter flask in place of a 2-liter flask, there were added 75 grams of water and 77 grams of the above-described, previously prepared emulsion. The bath temperature was maintained at 90° C. throughout the run. After 35 minutes, the reflux temperature of the emulsion increased from 83° C. to 87° C., and the remainder of the previously prepared emulsion was added incrementally over a 174 minute period. This reaction was continued for an additional 153 minutes. The resulting polymer was then tested to determine its intrinsic viscosity and thermal stability. The intrinsic viscosity was determined by ASTM–D123–66 except that acetone was used as the solvent in place of cyclohexanone. The results of this run are set forth in Table II.

Example D.—Prior art

Using the same equipment and procedure as described in Example 7, 0.7 gram of $K_2S_2O_8$ was substituted for the $K_4P_2O_8$. Fifteen minutes after the initial emulsion was charged to the flask, the remainder of the emulsion was added dropwise over 140 minutes. After an additional 160 minutes, the reaction was terminated. The resutling polymer was tested as in Example 7, and the results of the tests are set forth in Table II.

Example 8.—Methyl methacrylate polymerization

Using the same equipment and procedure as described in Example 7, 0.71 gram of dipotassium peroxydisulfate ($K_2S_2O_8$) was added along with the $K_4P_2O_8$ to the original emulsion of Example 7. Fifteen minutes after the original charge of emulsion was added to the flask, the remainder of the emulsion was added dropwise over 137 minutes. After the reaction was allowed to continue for an additional 238 minutes, the reaction was terminated. The resulting polymer was tested as set forth in Example 7, and the results of the tests are set forth in Table II.

TABLE II.—METHYL-METHACRYLATE POLYMERIZATIONS

|  | Example Number | | |
| --- | --- | --- | --- |
|  | 7 | D-prior art | 8 |
| Initiator system | (1) | (2) | (3) |
| Reaction temp., °C | 90 | 90 | 90 |
| Inception time, mins | 35 | 15 | 15 |
| Monomer addition time, mins | 174 | 140 | 137 |
| Total reaction time, mins | 361 | 315 | 390 |
| Percent conversion-monomer to polymer | 87.6 | 93.7 | 95.1 |
| Intrinsic viscosity, η | 5.1 | 0.83 | 0.82 |
| Thermal stability color 1,200 hours at 150° C | (4) | (5) | (6) |

1 $K_4P_2O_8$.
2 $K_2S_2O_8$.
3 $K_2S_2O_8+K_4P_2O_8$.
4 Very light amber-tan.
5 Medium amber-tan.
6 Light amber-tan.

Example 9.—Vinyl chloride polymerization

A solution of 1.1 grams of ammonium stearate in 119 grams of deionized water were added to a 250 ml. heavy-walled glass bottle. The bottle was placed in a freezer until the contents were frozen. Thereafter, a solution of 0.54 gram of $K_4P_2O_8$ in 10 grams of water was added to the bottle. The bottle was then returned to the freezer, and the latter solution frozen. Thereafter, 74–75 grams of inhibitor-free vinyl chloride were added to the bottle. Excess vinyl chloride was permitted to boil off to displace any air that remained in the bottle. Thereafter, the weight of vinyl chloride remaining in the bottle was found to be 72.4 grams, and the bottle was then capped and placed in a water bath at 40° C. The bottle was agitated at 35 r.p.m. by means of a rotating shaft in the center of the water bath. After 20 hours in the water bath, the bottle was removed, cooled in a Dry Ice-acetone mixture, and weighed. The cap was removed, and any unreacted monomer was permitted to escape. The bottle and contents were then reweighed to determine the conversion of monomer to polymer. The resulting polymer was then tested to determine its intrinsic viscosity and thermal stability. The intrinsic viscosity was determined by the method set forth in ASTM–D123–66 using cyclohexanone as the solvent. The results of this test are set forth in Table III.

Example E.—Prior art

Using the same equipment and procedure as described in Example 9, 0.4 gram of $K_2S_2O_8$ was substituted for the $K_4P_2O_8$. The resulting polymer was tested as set forth in Example 9, and the results of the tests are set forth in Table III.

Example 10.—Vinyl chloride polymerization

Using the same equipment and procedure described in in Example 9, 0.54 gram of $K_2S_2O_5$ was added to the mixture described in Example 9. The resulting polymer was tested as set forth in Example 9, and the results of the tests are set forth in Table III.

TABLE III.—VINYL CHLORIDE POLYMERIZATIONS

|  | Example Number | | |
| --- | --- | --- | --- |
|  | 9 | E-prior art | 10 |
| Initiator system | (1) | (2) | (3) |
| Reaction temp., °C | 40 | 40 | 40 |
| Total reaction time, mins | 1,200 | 1,200 | 1,200 |
| Percent conversion-monomer to polymer | 97.5 | 94 | 99 |
| Intrinsic viscosity, η | 1.37 | 1.34 | 0.8 |

1 $K_2P_2O_8$.
2 $K_2S_2O_8$.
3 $K_4P_2O_8+K_2S_2O_5$.

Example 11.—Styrene polymerization

Using the same general equipment set forth in Example 1, a flask was charged with a mixture of 190 grams of water, 4 grams of ethoxylated lauryl sulfate (SIPEX–ES) and 2 grams of lauryl fatty alcohol ethoxylate (SIPONIC L–12). The flask was placed in a water bath and stirred for 5 minutes at 80° C. Thereafter, 50 grams of freshly distilled styrene were added with mixing. After an additional 15 minutes, 1.65 grams of tetrapotassium peroxydiphosphate were added to the mixture. When the mixture in the flask attained a 5° C. rise above the temperature of the water bath, a prepared emulsion containing 280 grams of water, 44 grams of ethoxylated lauryl sulfate (SIPEX–ES), 16 grams of lauryl fatty acid ethoxylate (SIPONIC L–12) and 550 grams of styrene was added to the flask in increments over a 3.5 hour period. After complete addition of the prepared emulsion, the water bath temperature was raised to 90° C., and maintained at this temperature for 2 hours. The flask was then removed, and the reaction terminated. The resulting polymer was tested as set forth in Example 7 to determine its intrinsic viscosity and thermal stability. The intrinsic viscosity was determined by the method set forth in ASTM–D123–66 except that benzene was used as a solvent in place of cyclohexanone. The results of the tests are set forth in Table IV.

Example F.—Prior art

Using the procedure and equipment of Example 11, 1.2 grams of $K_2S_2O_8$ were substituted for the tetrapotassium peroxydiphosphate used in Example 11. The resulting polymer was tested as in Example 11, and the results of the tests are set forth in Table IV.

Example G.—Prior art

Using the same equipment and procedure of Example 11, 9 grams of 50% hydrogen peroxide were substituted for the tetrapotassium peroxydiphosphate. The resulting polymer was tested as set forth in Example 11, and the results of the tests are set forth in Table IV.

Example 12.—Styrene-butadiene polymerization

Using the same equipment as in Example 9, a heavy-walled, glass bottle was charged with 100 grams of water, 1 gram of sodium lauryl sulfate, 1 gram of egg albumen, 1 gram of 1,3-butadiene, 3 grams of sodium acetate and 0.25 gram of tetrapotassium peroxydiphosphate. The bottle was then placed in the freezer until the contents were frozen. Thereafter, 28 grams of liquid styrene (freshly distilled) containing 0.1 gram of t-dodecyl mercaptan were added to the bottle and the bottle was returned to the freezer to cool the styrene. Subsequently, 1,3-butadiene was added to the bottle, and some of the butadiene was permitted to boil off to displace air which was present in the bottle. Twenty-two grams of butadiene remained in the bottle; this bottle was then capped and placed in a water bath at 44° C. The bottle was agitated at 35 r.p.m. by means of a rotating shaft in the center of the water bath. After 24 hours in the water bath, the bottle was removed, cooled in a Dry Ice-acetone mixture and weighed. The cap was removed, and any unreacted monomer was permitted to escape. The bottle and contents were then reweighed to examine the conversion of monomer to polymer. The resulting polymer was then tested to determine its thermal stability. The results of this test are set forth in Table IV.

Example H.—Prior art

Using the same equipment and procedures set forth in Example 12, 0.18 gram of $K_2S_2O_8$ was substituted for the tetrapotassium peroxydiphosphate. The resulting polymer was tested as set forth in Example 12, and the results of this test are set forth in Table IV.

gram of $K_2S_2O_8$ in place of the tetrapotassium peroxydiphosphate. The resulting latex was tested as set forth in Example 13, and the results of the test are set forth in Table V.

Example 14.—Chloro-2, butadiene-1,3 polymerization

Using the same equipment and procedure as in Example 1, a flask was charged with 800 grams of water, 8 grams of the sodium salt of sulfated oleyl acetate and 200 grams of chloro-2, butadiene-1,3. The resulting emulsion was adjusted to a pH of 5 with dilute hydrochloric acid. Thereafter, 1.2 grams of tetrapotassium peroxydiphosphate were added to the emulsion, and the flask was placed in a water bath at a temperature of 40° C. The resulting polymerization was monitored, and when the latex density reached a value of 1.031 (measured at 20° C.) the polymerization was terminated by adding 2 grams of phenol-beta-naphthylamine. The resulting polymer was coagulated, washed, dried and then tested for

TABLE IV.—STYRENE AND STYRENE-BUTADIENE POLYMERIZATION

| | Example Number | | | | |
|---|---|---|---|---|---|
| | 11 | F-prior art | G-prior art | 12 | H-prior art |
| Monomer | Styrene | Styrene | Styrene | Styrene-butadiene copolymer. | Styrene-butadiene copolymer. |
| Initiator system | $K_4P_2O_8$ | $K_2S_2O_8$ | $H_2O_2$ | $K_4P_2O_8$ | $K_2S_2O_8$. |
| Reaction temp., ° C | 80–90 | 80–90 | 80–90 | 44 | 44. |
| Reaction time, mins | 540 | 439 | 412 | 1,440 | 1,440. |
| Monomer addition time, mins | 210 | 120 | 120 | | |
| Percent conversion monomer to polymer | 99.3 | 92 | 89 | | |
| Intrinsic viscosity, η | 2.2 | 1.5 | 1.4 | | |
| Thermal stability: | | | | | |
| Color 7 hours at 150° C | | | | Pale amber | Medium amber. |
| Color 1,200 hours at 150° C | Light amber | Medium amber | medium amber | | |
| Light stability color 1,500 hours in Weatherometer containing double carbon arc. | Light yellow-tan | Medium yellow-tan | | | |

Example 13.—Styrene-butadiene (SBR-rubber) polymerization

A solution of 3 grams of sodium lauryl sulfate in 100 grams of deionized water was added to the 250 ml. heavy-walled, glass bottle. The bottle was placed in a freezer until the contents were frozen. Thereafter, a solution of 0.25 gram of tetrapotassium peroxydiphosphate in 18 grams of water was added to the bottle. The bottle was then returned to the freezer, and the latter solution frozen. Thereafter, 13 grams of liquid styrene which contained 0.3 gram of n-dodecyl mercaptan were added to the bottle. The bottle was then returned to the freezer to cool the contents. Subsequently, from 46 to 47 grams of 1,3-butadiene were added to the bottle, and some butadiene was permitted to boil off to displace any air which was in the bottle. The amount of butadiene remaining in the bottle was 45 grams. The bottle was then capped with a crown cap having a rubber liner. Five milliliters of an aqueous solution containing 0.04 gram of ferrous sulfate and 0.25 gram $K_2S_2O_5$ was added to the bottle by means of a hypodermic needle through the rubber liner of the bottle cap. The bottle was then placed in a water bath at 44° C., and the bottle was rotated at 35 r.p.m. by means of a rotating shaft in the center of the water bath. After 17 hours, the bottle was removed from the bath, cooled in a Dry Ice-acetone mixture and weighed. The cap was removed, and any unreactive monomer was permitted to escape. The bottle and its contents were then reweighed to determine the conversion of monomer to polymer. The storage stability of the resulting latex was determined by measuring its initial pH and the pH after 286 days of storage at 25° C. Also, the appearance of the latex was determined after 286 days of storage at 25° C. These results are set forth in Table V.

Example J.—Prior art

Using the same equipment and procedure described in Example 13, the experiment was repeated using 0.18 thermal stability. The results of this test are set forth in Table V.

Example K.—Prior art

Using the same equipment and procedure as in Example 14, the experiment was repeated except that .87 gram of $K_2S_2O_8$ was substituted for the tetrapotassium peroxydiphosphate. The resulting polymer was coagulated, washed, dried and tested as set forth in Example 14. The results of this test are set forth in Table V.

TABLE V.—ELASTOMER POLYMERIZATION

| | Example Number | | | |
|---|---|---|---|---|
| | 13 | J-prior art | 14 | K-prior art |
| Monomer | (1) | (1) | (2) | (2) |
| Initiator system | (3) | (4) | (5) | (6) |
| Reaction temp., ° C | 44 | 44 | 40 | 40 |
| Reaction time, mins | 1,020 | 1,020 | 450 | 320 |
| Percent conversion-monomer to polymer | | | | |
| Thermal stability color 7 hours at 150° C | | | (7) | (8) |
| Storage stability: | | | | |
| pH original | 8.0 | 6.9 | | |
| pH after 286 days at 25° C | 6.8 | 2.3 | | |
| Appearance of latex after 286 days | (9) | (10) | | |

1 Styrene-butadiene.
2 Chloro-2-butadiene-1,3.
3 $K_4P_2O_8+K_2S_2O_5+FeSO_4$.
4 $K_2S_2O_8+K_2S_2O_5+FeSO_4$.
5 $K_4P_2O_8$.
6 $K_2S_2O_8$.
7 Pale amber.
8 Medium amber.
9 No coagulation.
10 Some coagulation.

Example 15.—Vinylidene chloride polymerization

Using the same equipment as Example 1, a flask was charged with 430 grams of water, 80 grams of sodium lauryl sulfate and 300 grams of freshly distilled vinylidene chloride. After stirring for 15 minutes at 25° C., 2.4 grams of tetrapotassium peroxydiphosphate were dissolved in 50 grams of water, and this solution was added to the flask. After stirring for an additional 5 minutes, 0.1 gram of ferrous sulfate, dissolved in 100 grams of water, and 2.4 grams of $K_2S_2O_5$, dissolved in 100 grams of water, were added to the flask. The flask was placed in a water bath at 25° C. and allowed to react for 24 hours. Thereafter, an aqueous hydroquinone solution was added to stop the polymerization. The resulting polymer was coagulated, washed, dried and then tested for thermal stability. The results of the test are set forth in Table V.

Example L.—Prior art

Using the same equipment and procedure as set forth in Example 15, this experiment was repeated except that 1.7 grams of $K_2S_2O_8$ were substituted for the tetrapotassium peroxydiphosphate. The resulting polymer was tested in the same way as set forth in Example 15, and the results of the test are set forth in Table V.

Example 16.—Vinyl acetate-dibutyl fumarate polymerization

Using the same equipment and procedure set forth in Example 7, a flask was charged with 29 grams of ethoxylated alkylaryl sulfonate (Triton X–200), 4 grams ethoxylated dodecyl phenol (Sterox DJ), 3 grams of itaconic acid, 510 grams water and 15 ml. of a 10% aqueous sodium hydroxide solution. The above charge was heated in the flask to 80° C., and 23 grams of freshly distilled vinyl acetate were added. After 15 minutes, 5.5 grams of tetrapotassium peroxydiphosphate dissolved in 70 ml. of water were added to the mixture. When the temperature in the flask had risen to 80° C., a preformed solution containing 150 grams of dibutyl fumarate, 5 grams of Sterox DJ and 600 grams of vinyl acetate was added incrementally over a 5 hour period. After all of the preformed emulsion had been added, the reaction flask was maintained at 80° C. for an additional hour. The resulting polymer was then tested to determine its thermal stability, and the results of this test are set forth in Table VI.

Example M.—Prior art

Using the same equipment and procedure as set forth in Example 16, the experiment was repeated except that 4 grams of $K_2S_2O_8$ were substituted for the tetrapotassium peroxydiphosphate. The resulting polymer was tested as set forth in Example 16, and the results of the test are set forth in Table VI.

Example 17

Using the same equipment and procedure as set forth in Example 16, dibutyl maleate was substituted in equivalent amounts for the dibutyl fumarate. The resulting polymer was tested for thermal stability as set forth in Example 16, and the results of the test are set forth in Table VI.

Example N.—Prior art

Using the same equipment and procedure as set forth in Example 17, 4 grams of $K_2S_2O_8$ were substituted for the tetrapotassium peroxydiphosphate. The resulting polymer was tested for thermal stability as set forth in Example 17, and the results of the test are set forth in Table VI.

TABLE VI.—VINYLIDENE CHLORIDE AND VINYL ACETATE COPOLYMER POLYMERIZATIONS

| | \multicolumn{6}{c}{Example Number} | | | | | |
|---|---|---|---|---|---|---|
| | 15 | L- prior art | 16 | M- prior art | 17 | N- prior art |
| Monomer or comonomer | (1) | (1) | (2) | (2) | (3) | (3) |
| Initiator system | (4) | (5) | (6) | (7) | (6) | (7) |
| Reaction temp., ° C | 25 | 25 | 80 | 80 | 80 | 80 |
| Inception time, mins | | | 60 | 15 | 57 | 14 |
| Monomer addition time, mins | | | 300 | 300 | 300 | 300 |
| Reaction time, mins | 1,440 | 1,440 | 420 | 375 | 437 | 374 |
| Percent conversion-monomer to polymer | 97 | 93 | | | | |
| Thermal stability color 5 hours at 150° C | | | (8) | (9) | (8) | (9) |
| Color 7 hours at 150° C | (10) | (11) | | | | |

[1] Vinylidene chloride.
[2] Dibutyl fumarate.
[3] Dibutyl maleate.
[4] $K_4P_2O_8+K_2S_2O_5+FeSO_4$.
[5] $K_2S_2O_8+K_2S_2O_5+FeSO_4$.
[6] $K_4P_2O_8$.
[7] $K_2S_2O_8$.
[8] Light yellow.
[9] Medium yellow.
[10] Light amber.
[11] Dark amber.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. In the process of polymerizing aqueous emulsions of substantially water-insoluble monomers and copolymers selected from the group consisting of vinyl acetate, vinyl acetate-dibutylmaleate, vinylacetate-dibutyl fumarate, vinyl chloride, vinylidene chloride, styrene, styrene copolymers, lower alkyl ester acrylates and methacrylates, 2-chloro-butadiene-1,3-elastomers and styrene-butadiene elastomers containing at least 50% by weight of butadiene, in the presence of an active oxygen-containing initiator, the improvement which comprises using as an initiator from 0.01 to 10% by weight of a peroxydiphosphate salt selected from the group consisting of tetrasodium peroxydiphosphate, tetrapotassium peroxydiphosphate, tetralithium peroxydiphosphate, tetraammonium peroxydiphosphate and the protonated salts thereof, mixed peroxydiphosphate salts identified by the formula $M_mN_{4-(m+n)}H_nP_2O_8$, where M and N are cations which may be either sodium, potassium, lithium or ammonium cations but where M is a different cation from N, where $m$ is an integer from 1 to 3 and $n$ is an integer of 0 or 2, and $(m+n)$ are less than 4.

2. Process of claim 1 wherein said initiator is tetrapotassium peroxydiphosphate.

3. Process of claim 1 wherein said initiator is dipotassium dihydrogen peroxydiphosphate.

4. Process of claim 1 wherein said initiator is tetraammonium peroxydiphosphate.

5. Process of claim 1 wherein said initiator is a mixture of said peroxydiphosphate salt and a peroxydisulfate.

References Cited

UNITED STATES PATENTS 3,405,106  10/1968  Scanley _____ 260—80
3,474,461  10/1969  Otsuetal _____ 260—92.8

JOSEPH L. SCHOFER, Primary Examiner

J. KIGHT, Assistant Examiner

U.S. Cl. X.R.

252—437; 260—29.6, 80, 82.1, 83.7, 85.7, 86.1, 88.1, 89.1, 89.5, 91.7, 92.3, 92.8, 93.5

UNITED STATES PATENT OFFICE
CERTIFICATE OF CORRECTION

Patent No. 3,535,292  Dated October 20, 1970

Inventor(s) Harry M. Castrantas et al

It is certified that error appears in the above-identified patent and that said Letters Patent are hereby corrected as shown below:

Column 5, line 71, "isothionate" should read --isethionate--.

Column 6, line 32, "to" should read --to about--.

Column 6, line 39, "Vinyl Polymerization" should read --Vinyl Acetate Polymerization--.

Column 10, line 20, "$K_2P_2O_8$" should read --$K_4P_2O_8$--.

Signed and sealed this 11th day of January 1972.

(SEAL)
Attest:

EDWARD M. FLETCHER, JR.  ROBERT GOTTSCHALK
Attesting Officer  Acting Commissioner of Patents